Feb. 5, 1963 W. P. CASEY, JR 3,076,467
TANK DUMPING APPARATUS
Filed Sept. 14, 1961 2 Sheets-Sheet 1

INVENTOR.
Walter P. Casey Jr.
BY
Agent

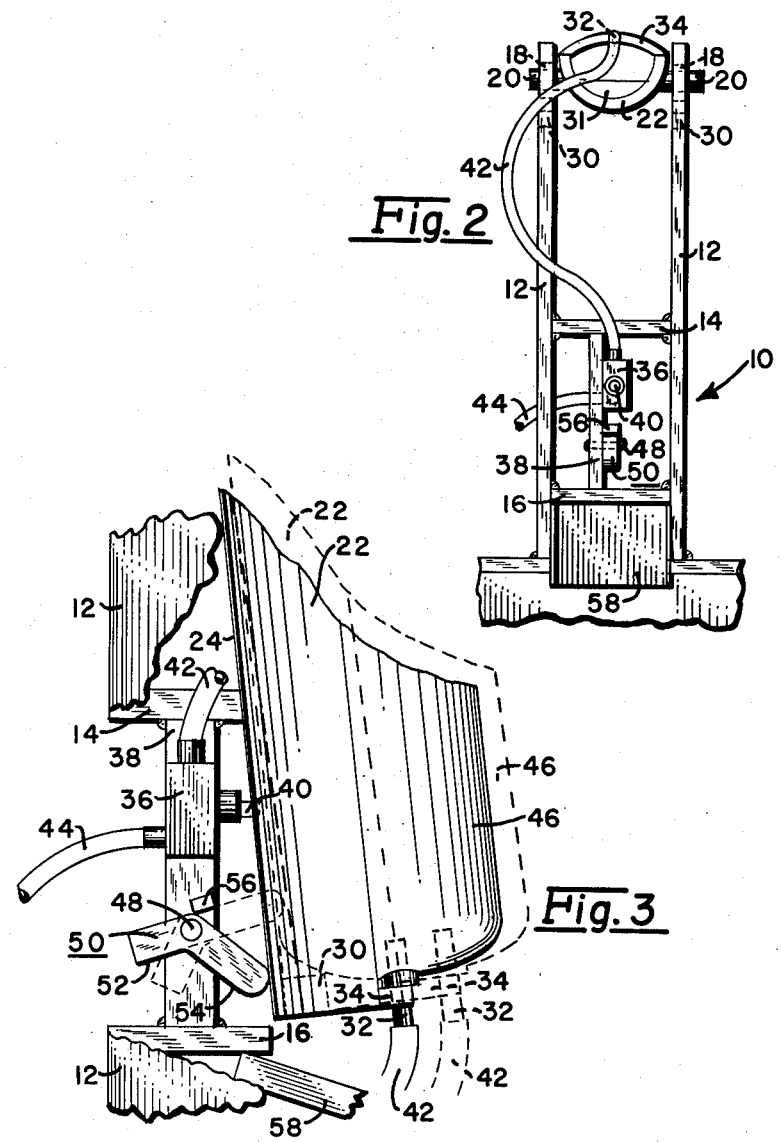

United States Patent Office 3,076,467
Patented Feb. 5, 1963

3,076,467
TANK DUMPING APPARATUS
Walter P. Casey, Jr., Las Vegas, Nev., assignor to Pier, Incorporated, Las Vegas, Nev., a corporation of Nevada
Filed Sept. 14, 1961, Ser. No. 138,179
6 Claims. (Cl. 134—48)

This invention relates to a device for dumping the contents from an elongated tank, and more particularly to a device which automatically dumps and washes out the contents of a portable elongated tank.

Portable tanks used in water conditioning systems, and containing a slurry or suspension of finely divided ion exchange resin in water, are difficult to efficiently dump and wash out. Such tanks are often installed with active resin content at the premises of a user. They are periodically collected, and taken to a regeneration plant where the spent resin is dumped and washed out of the tanks into a hopper or dump tank which serves as the starting point for a process for regenerating the spent resin. The tanks are refilled with regenerated resin and are available for replacement of tanks containing spent resin. Since the portable tanks are elongated, relatively heavy, and numerous, and dumping and washing out the resin contents by hand is expensive and laborious, a real need exists for equipment to automatically handle the dumping and washing operation.

A principal object of this invention is, therefore, to provide apparatus for automatically dumping and washing out the contents of an elongated tank. Another object of this invention is to provide improved tank dumping apparatus. These and other objects of this invention will be apparent from the following description thereof and from the annexed drawings in which:

FIG. 2 shows a front view of the apparatus of FIG. 1.

FIG. 3 shows a detail view, somewhat enlarged compared to FIGS. 1 and 2, of the wash control valve and shut off detent, and associated construction.

Figure 1:
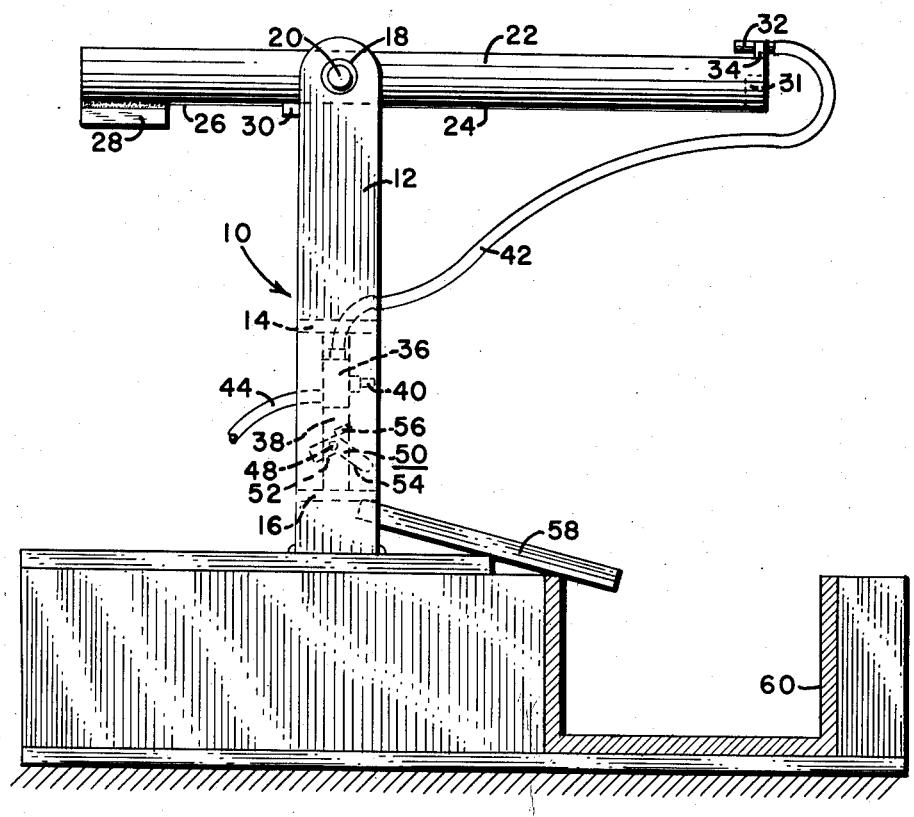
FIG. 1 shows a side view of apparatus embodying features of this invention.

Referring particularly to FIGS. 1 and 2, the device comprises a cradle indicated generally at 10, which is formed by uprights 12 spaced and braced by upper cross member 14 and lower cross member 16. Near the tops of uprights 12 are provided bearings 18 in which are rotatably mounted trunnions 20 which project on either side from an elongated tank holder 22. The location of trunnions 20 on tank holder 22 is at a position unequally spaced from the ends thereof, so in effect to provide a long end 24 and a short end 26 of tank holder 22. The short end 26 is weighted, as by attachment of counterweight 28, so that the short end 26 will be slightly heavier than long end 24 with respect to their support point, that is at mounting trunnions 20, when tank holder 22 is empty. However the relative effective weights of short end 26 and long end 24 should also be such that when tank holder 22 is loaded with a tank, then the loaded weight of long end 24 will be greater than that of short end 26 and tank 22 will rotate to near vertical position as hereinafter described. Means such as bar 30, attached as by welding to uprights 12, is arranged under tank holder short end 26 to support it and the tank holder 22 as a whole, in horizontal position when the tank holder 22 is empty as shown.

As will be seen more clearly in FIG. 2, tank holder 22 is of arcuate form in cross section adapted thereby to hold an elongated circular tank. The short end 26 of tank holder 22 is preferably open to facilitate loading of a tank thereon, and the long end 24 is preferably provided with a stop as at 31 to hold a tank in or on the holder, particularly when rotated to near vertical position. Means for injecting a washing fluid are provided which comprise nozzle 32 which is suitably supported by brace 34 attached to the sides of the end of tank holder long end 24 as shown. Nozzle 32 is arranged to provide a flow of fluid into a tank located in tank holder 22 and is therefore arranged to point at or enter into the open mouth or opening in the end of such tank.

Also mounted on cradle 10 is spring valve 36, which in the embodiment illustrated is attached to plate 38 which is attached to and spans the distance between cross members 14 and 16. Spring valve 36 is of customary action, that is, normally closed and may be opened by actuation of projecting stem 40. A connection from the outlet of spring valve 36 to nozzle 32 is made by means of flexible hose 42, and the inlet of spring valve 36 is connected as by piping 44 to a source of fluid under pressure (not shown). Water will be often employed as the fluid for washing out the tank contents, and piping 44 may be connected conveniently, as will be apparent, to a water main supply line.

FIG. 3 shows tank holder 22 in near vertical position having been rotated from its empty horizontal position by having been loaded with tank 46. Pivotably attached to plate 38 as at 48, is bell-crank shaped detent 50 which is arranged to selectively engage the long end 24 of tank holder 22, when in near vertical position, thereby to maintain long end 24 spaced apart from stem 40 of valve 36 thus shutting off the flow of washing fluid through valve 36. Detent 50 has two arms 52 and 54 so that when pivoted, conveniently by pedal pressure on arm 52, its other arm 54 engages tank holder long end 24 and maintains it spaced apart from valve stem 40. Preferably arm 54 of detent 50 is longer, or heavier, than arm 52 so that it normally hangs as shown in the full lines in FIG. 3, its position when raised so that arm 54 engages tank holder long end 24 being shown in dotted lines. Fixedly attached to plate 38 is stop member 56 against which detent arm 54 abuts when raised in a position in which the angle of detent arm in rotating has passed the vertical angle with respect to the plane of the surface of tank holder long end 24 which it contacts. In the position shown in dotted lines in FIG. 3, detent 50 is locked in place since its arm 52 cannot naturally fall back to its original (full line) position due to its angle with tank holder end 24 and the weight thereof, and cannot be moved further upwardly because of stop 56.

For convenience in handling material dumped from a tank according to this invention, there may be arranged a suitable discharge chute 58 leading into a collector tank 60.

In operation the empty tank holder 22 will normally be horizontal as seen in FIG. 1. A tank to be dumped, with its mouth or discharge hole open to align with nozzle 32, is then slid on to tank holder 22 from the open short end 26 thereof until its further end stops by abutment against stop 31, with nozzle 32 either entering or pointing into and aligned with its discharge hole. As soon as the tank is in this position on tank holder 22, the greater weight of its length on long end 24 overcomes the weight of short end 26 (which supports a shorter portion of the loaded tank) and tank holder tilts to near vertical position as shown in FIG. 3. In this position the long end 24 contacts and presses in stem 40 of valve 36, thus actuating and opening this valve and allowing fluid to flow from pressure supply line 44 through hose 42 and out nozzle 32 to direct a stream of washing fluid into the interior of the tank. It will be seen that the long end 24 of tank holder 22 thus controls the means for injecting fluid into the tank. The near inverted position and washing action of the fluid stream from nozzle 32 quickly dump and wash out the contents of the tank into chute 58 from whence it may flow into collector tank 60.

When sufficient fluid has been delivered from nozzle 32 to wash out the original contents of the tank as effectively as desired, detent 50 is actuated by pedal pressure on arm 52 to lock its arm 54 in raised position (as seen in dotted lines in FIG. 3) to displace and maintain lower end 24 of tank holder 22 spaced away from valve actuating stem 40 and thus closing valve 36, shutting off the flow of fluid through nozzle 32.

With the tank now empty, washed out, and the fluid flow shut off, the tank may, when convenient, be simply lifted off tank holder 22. The greater empty weight of short end 26 will then return tank holder 22 to its original empty, horizontal position as seen in FIG. 1, ready for automatic dumping and washing out of another tank.

It may be advantageous to arrange a number of units of the tank dumping apparatus of this invention in aligned side by side relationship with discharge arrangements leading to a common collector tank. A number of tanks may then be loaded onto the tank holders in progression and as each tank is slid onto its tank holder, no further attention is needed from the operator until after it has been automatically dumped and washed out. After a row of tanks have been sufficiently washed out the operator simply walks down the line and shuts off the water flow in each one as previously described and he may then remove the dumped and the washed tanks systematically for further handling and eventual refilling. Such an organization is of great value and usefulness in handling a number of portable service tanks employed in water softener regeneration plants as hereinbefore described.

I claim:

1. Tank dumping and washing apparatus comprising; a cradle, an elongated tank holder rotatably mounted in said cradle at a position unequally spaced from the ends of said tank holder thereby to form a long end and a short end of said tank holder, the short end of said tank holder being weighted so as to be heavier than the long end thereof when said tank holder is empty, a stop member attached to said cradle under the short end of said tank holder to support it and said tank holder when empty in substantially horizontal position, the effective weights of the long and short ends of said tank holder being such that when a tank is loaded into said tank holder the loaded weight of the long end will be heavier than the loaded weight of the short end thereof and the tank holder will rotate to near vertical position, and means for injecting a washing fluid into the interior of a tank loaded in said tank holder, said means for injecting said washing fluid being controlled by the long end of said tank holder when rotated to near vertical position by the loading of a tank therein.

2. Tank dumping and washing apparatus comprising; a cradle, an elongated tank holder rotatably mounted in said cradle at a position unequally spaced from the ends of said tank holder thereby to form a long end and a short end of said tank holder, the short end of said tank holder being weighted so as to be heavier than the long end thereof when said tank holder is empty, a stop member attached to said cradle under the short end of said tank holder to support it and said tank holder when empty in substantially horizontal position, the effective weights of the long and short ends of said tank holder being such that when a tank is loaded into said tank holder the loaded weight of the long end will be heavier than the loaded weight of the short end thereof and the tank holder will rotate to near vertical position, means including a spring valve for injecting a washing fluid into the interior of a tank loaded into said tank holder, said spring valve being actuated by the long end of said tank holder when rotated to near vertical position by the loading of a tank therein.

3. Tank dumping and washing apparatus comprising; a cradle, an elongated tank holder rotatably mounted in said cradle at a position unequally spaced from the ends of said tank holder thereby to form a long end and a short end of said tank holder, the short end of said tank holder being weighted so as to be heavier than the long end thereof when said tank holder is empty, a stop member attached to said cradle under the short end of said tank holder to support it and said tank holder when empty in substantially horizontal position, the effective weights of the long and short ends of said tank holder being such that when a tank is loaded into said tank holder the loaded weight of the long end will be heavier than the loaded weight of the short end thereof and the tank holder will rotate to near vertical position, and means for injecting a washing fluid into the interior of a tank loaded into said tank holder, said means including a normally closed spring valve adapted to be opened by the long end of said tank holder when rotated to near vertical position by the loading of a tank therein.

4. Tank dumping and washing apparatus comprising; a cradle, an elongated tank holder rotatably mounted in said cradle at a position unequally spaced from the ends of said tank holder thereby to form a long end and a short end of said tank holder, the short end of said tank holder being weighted so as to be heavier than the long end thereof when said tank holder is empty, a stop member attached to said cradle under the short end of said tank holder to support it and said tank holder when empty in substantially horizontal position, the effective weights of the long and short ends of said tank holder being such that when a tank is loaded into said tank holder the loaded weight of the long end will be heavier than the loaded weight of the short end thereof and the tank holder will rotate to near vertical position, and means including a spring valve for injecting a washing fluid into the interior of a tank loaded into said tank holder, said spring valve being actuated by the long end of said tank holder when rotated to near vertical position by the loading of a tank therein, and a detent mounted on said cradle adapted selectively to maintain said long end of said tank holder spaced apart from said spring valve, thereby to shut off the flow of said washing fluid through said valve.

5. Tank dumping and washing apparatus comprising; a cradle, an elongated tank holder rotatably mounted in said cradle at a position unequally spaced from the ends of said tank holder thereby to form a long end and a short end of said tank holder, the short end of said tank holder being weighted so as to be heavier than the long end thereof when said tank holder is empty, a stop member attached to said cradle under the short end of said tank holder to support it and said tank holder when empty in substantially horizontal position, the effective weights of the long and short ends of said tank holder being such that when a tank is loaded into said tank holder the loaded weight of the long end will be heavier than the loaded weight of the short end thereof and the tank holder will rotate to near vertical position, and means including a spring valve for injecting a washing fluid into the interior of a tank loaded into said tank holder, said spring valve being actuated by the long end of said tank holder when rotated to near vertical position by the loading of a tank therein, and a bell-crank shaped detent pivotably mounted on said cradle with one of its arms adapted selectively to engage said long end of said tank holder to maintain said long end of said tank holder spaced apart from said spring valve, thereby to shut off the flow of said washing fluid through said valve.

6. Tank dumping and washing apparatus comprising; a cradle, an elongated tank holder rotatably mounted in said cradle at a position unequally spaced from the ends of said tank holder thereby to form a long end and a short end of said tank holder, the short end of said tank holder being weighted so as to be heavier than the long end thereof when said tank holder is empty, a stop member attached to said cradle under the short end of said tank holder to support it and said tank holder when empty in substantially horizontal position, the effective weights of the long and short ends of said tank holder being such that when a tank is loaded into said tank holder the loaded weight of the long end will be heavier than the loaded weight of the short end thereof and the tank holder will rotate to near vertical position, and means including a spring valve for injecting a washing fluid into the interior of a tank loaded into said tank holder, said spring valve being actuated by the long end of said tank holder when rotated to near vertical position by the loading of a tank therein, and a bell-crank shaped detent pivotably mounted on said cradle with one of its arms adapted selectively to engage a surface of the said long end of said tank holder to maintain said tank holder spaced apart from said spring valve thereby to shut off the flow of washing fluid through said valve, and a stop member mounted on said cradle at a position to arrest further movement of said arm of said bell-crank shaped detent when said arm pivoting in engagement with said long end of said tank holder has passed beyond the vertical angle with respect to the plane of the engaged surface of said long end of said tank holder to maintain said long end of said tank holder spaced apart from said spring valve, thereby to shut off the flow of said washing fluid through said valve.

References Cited in the file of this patent

UNITED STATES PATENTS

| | | |
|---|---|---|
| 755,870 | Haywood | Mar. 29, 1904 |
| 1,492,949 | Allison | May 6, 1924 |
| 1,775,254 | Phelps | Sept. 9, 1930 |